United States Patent [19]
Fenton et al.

[11] Patent Number: 5,183,375
[45] Date of Patent: Feb. 2, 1993

[54] CONTAINER STACKING APPARATUS

[75] Inventors: Gary L. Fenton, Stoughton; Gerald A. Sill, Edgerton, both of Wis.; Robert S. Ingram, Forth Worth, Tex.; James G. Jimenez, San Francisco, Calif.

[73] Assignee: Stoughton Trailers, Inc., Stoughton, Wis.

[21] Appl. No.: 643,998

[22] Filed: Jan. 18, 1991

[51] Int. Cl.$^5$ .......................... B65D 90/12; B65G 1/14
[52] U.S. Cl. .......................... 410/35; 220/1.5; 220/23.4; 220/23.6; 24/287; 410/46; 410/78; 410/82; 206/503
[58] Field of Search ............ 24/287; 410/35, 46, 410/52, 77, 78, 82, 83, 156, 53, 54, 55, 68; 220/1.5, 23.6, 23.4, 4.26, 4.27; 206/503

[56] References Cited

U.S. PATENT DOCUMENTS

| | | | |
|---|---|---|---|
| 1,038,923 | 9/1912 | Mathy | 410/78 X |
| 3,357,371 | 12/1967 | Gutridge | 410/54 |
| 3,480,174 | 4/1969 | Sherwood | 220/1.5 |
| 3,518,728 | 7/1970 | Phillips | 24/287 |
| 3,543,951 | 12/1970 | Marvin | 206/503 |
| 3,691,595 | 9/1972 | Backteman et al. | 220/1.5 X |
| 3,734,308 | 5/1973 | Pasternack | 410/77 X |
| 3,776,169 | 12/1973 | Strecker | 410/77 |
| 3,797,691 | 3/1974 | Williams, Jr. | 220/1.5 |
| 3,980,185 | 9/1976 | Cain | 410/77 X |
| 4,108,326 | 8/1978 | Bertolini | 220/1.5 |
| 4,277,212 | 7/1981 | Rosaia | 410/78 |
| 4,388,032 | 6/1983 | Stohler et al. | 410/78 X |
| 4,624,188 | 11/1986 | Kaleta | 410/52 X |
| 4,626,155 | 12/1986 | Hlinsky et al. | 410/82 |
| 4,648,764 | 3/1987 | Pavlick | 410/82 X |
| 4,741,449 | 5/1988 | Bersani | 24/287 X |
| 4,743,150 | 5/1988 | Hlinsky et al. | 410/64 |
| 4,759,294 | 7/1988 | Schuller et al. | 105/355 |
| 4,768,905 | 9/1988 | Reynard | 410/78 |
| 4,776,736 | 10/1988 | Tatina | 410/83 |
| 4,784,548 | 11/1988 | Butcher et al. | 410/54 |

FOREIGN PATENT DOCUMENTS

| | | | |
|---|---|---|---|
| 269594 | 7/1989 | Fed. Rep. of Germany | 220/1.5 |
| 2172248 | 9/1986 | United Kingdom | 410/52 |

Primary Examiner—David A. Bucci
Assistant Examiner—Robert S. Katz
Attorney, Agent, or Firm—Michael, Best & Friedrich

[57] ABSTRACT

A container stacking apparatus for use in supporting a pair of cargo containers in stacked relation on at least one first cargo container, the container stacking apparatus comprising an elongated frame adapted to be supported on the at least one first cargo container, the elongated frame including a mechanism for supporting the pair of cargo containers in end-to-end relation thereon, a mechanism for releaseably locking the frame down on the first cargo container, and a mechanism for releaseably locking the pair of cargo containers down on the frame.

17 Claims, 5 Drawing Sheets

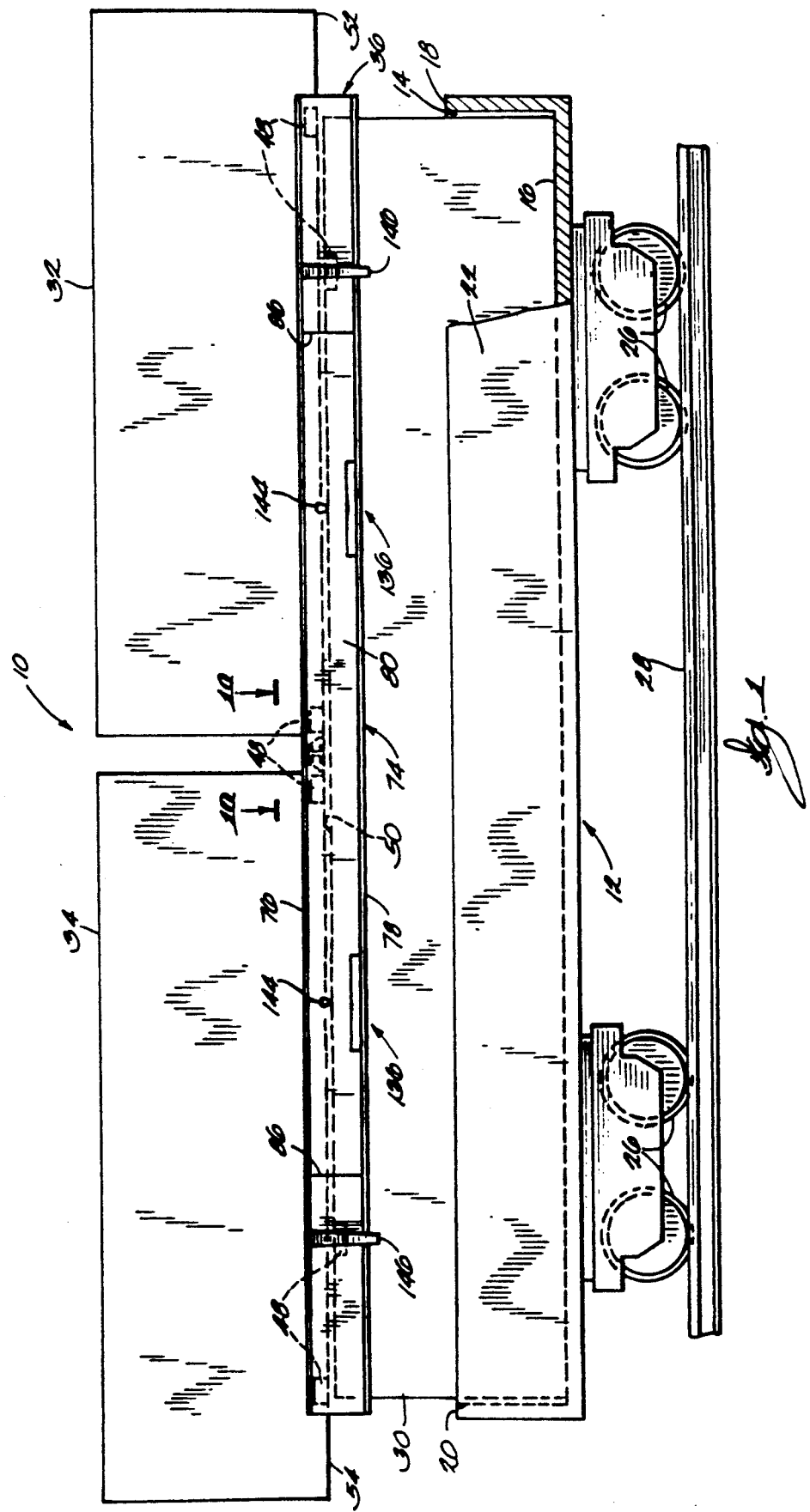

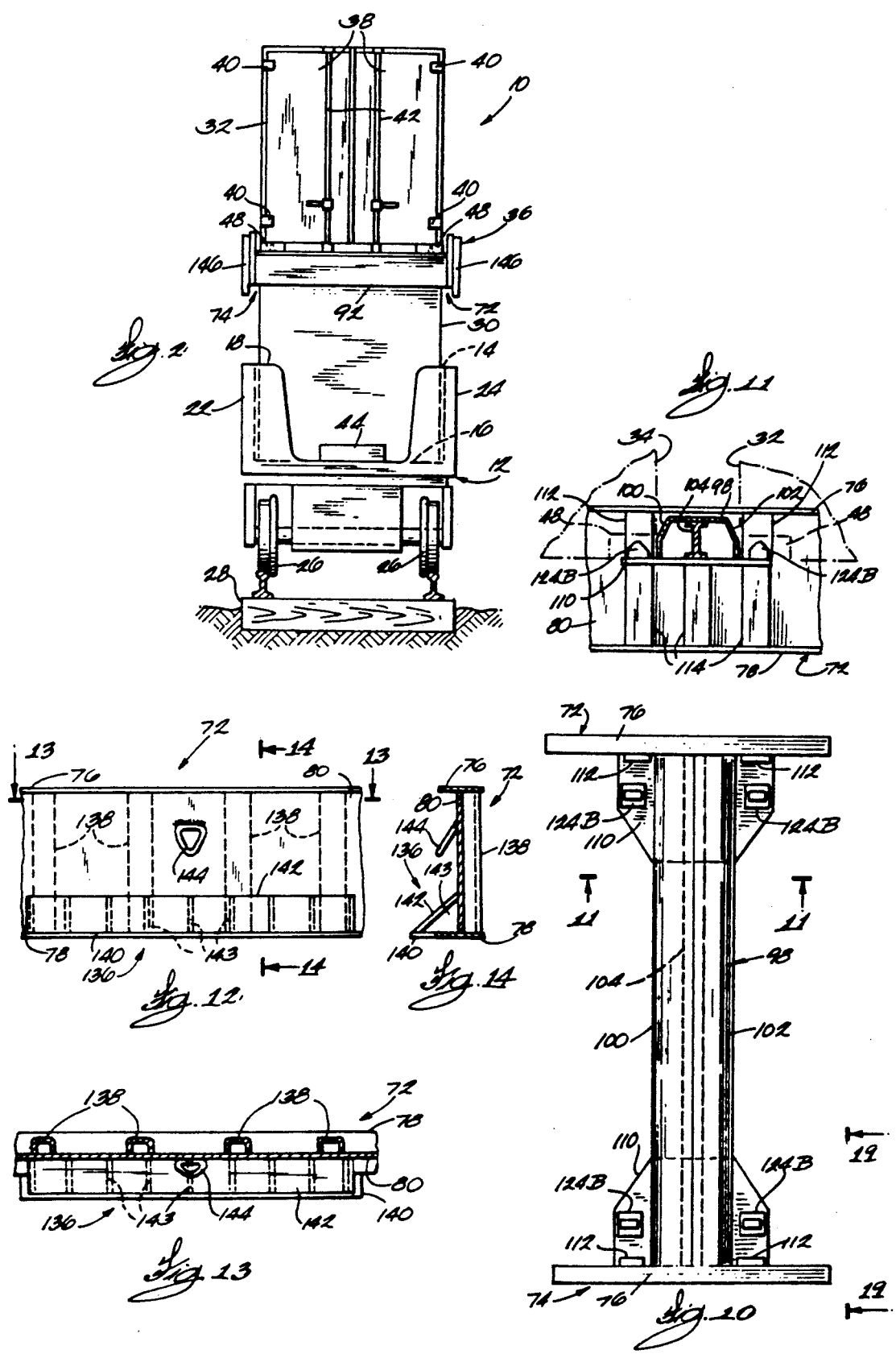

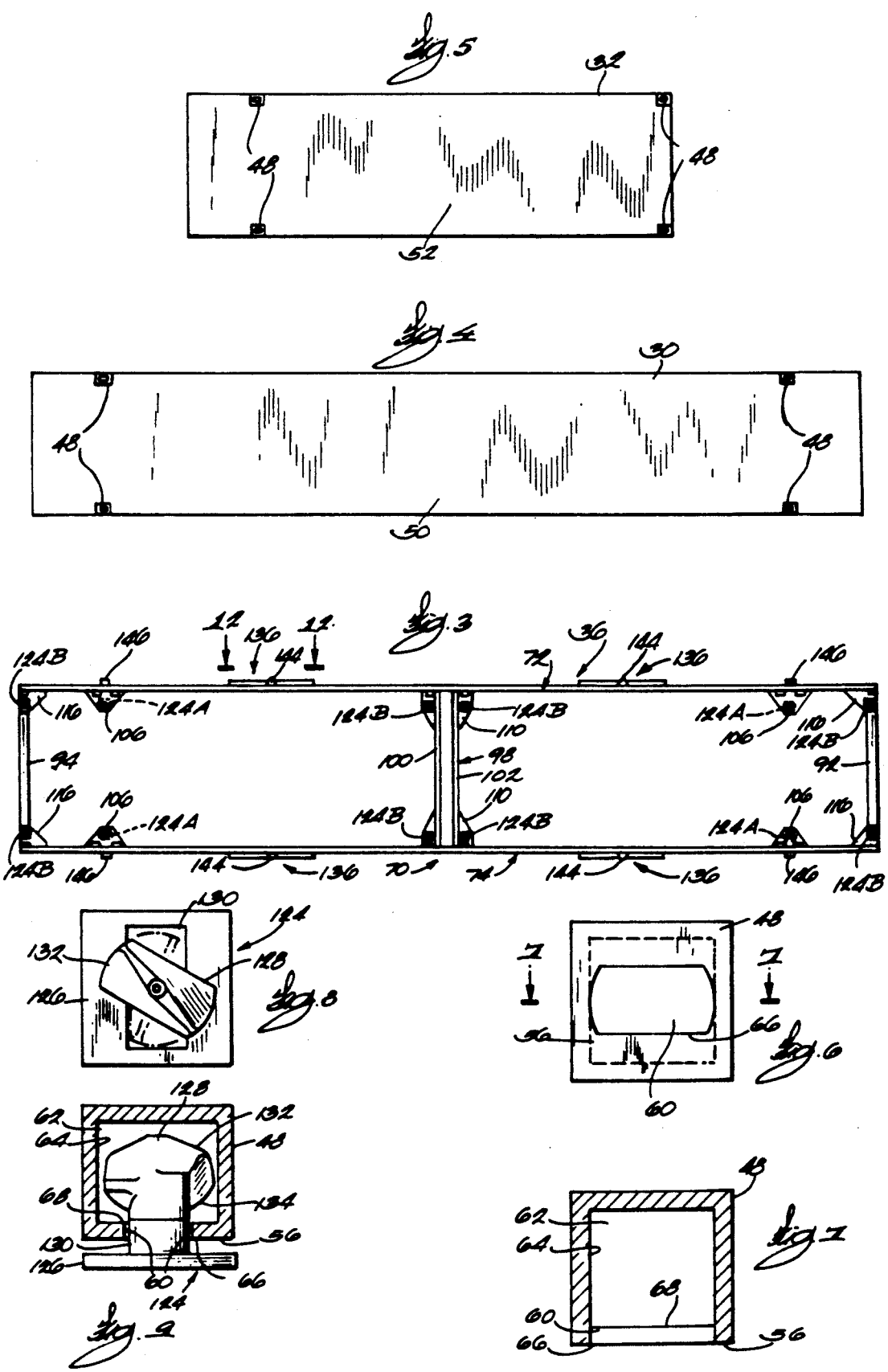

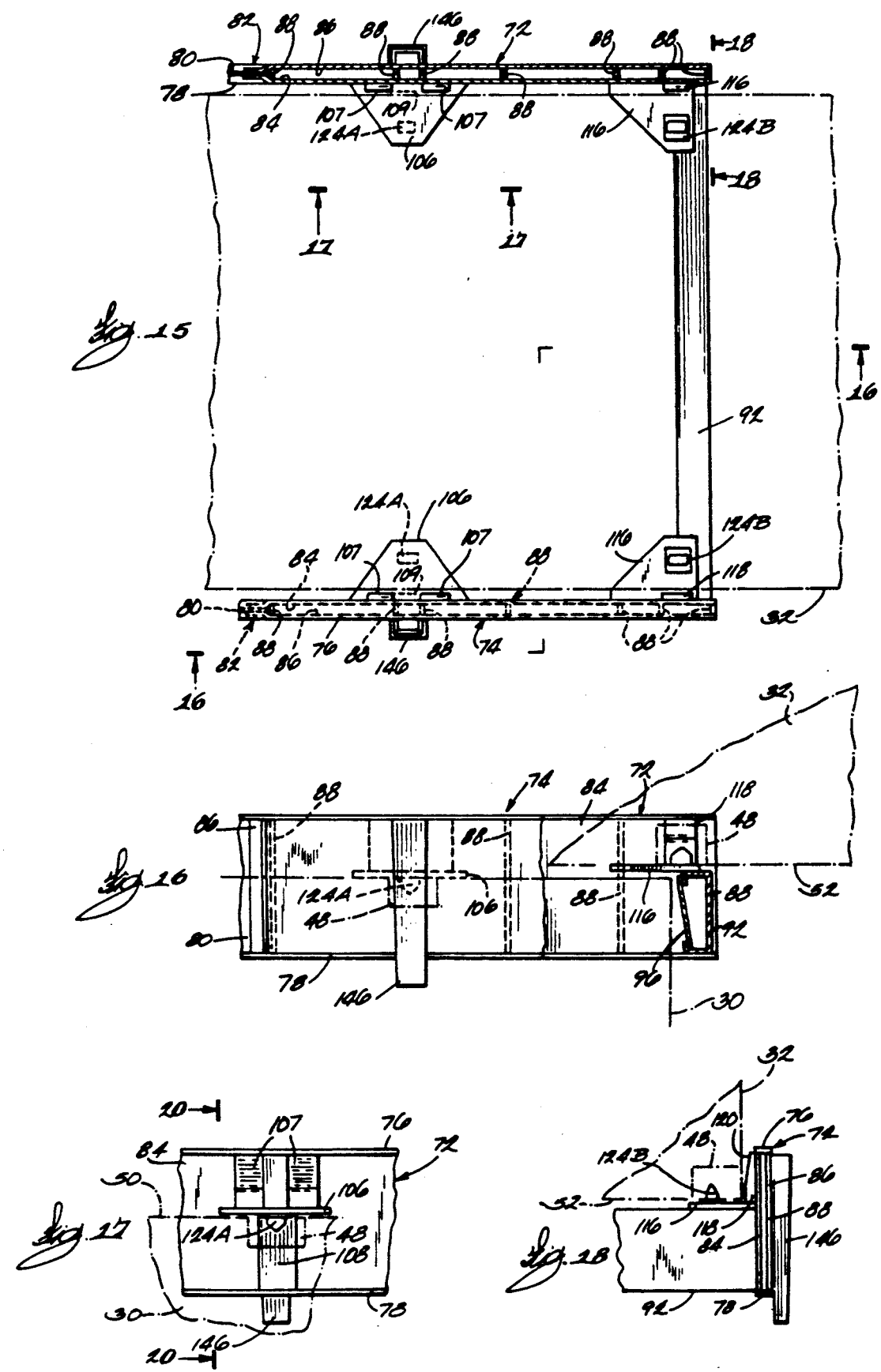

CONTAINER STACKING APPARATUS

BACKGROUND OF THE INVENTION

1. Field of the Invention

The present invention relates generally to the vertical stacking of cargo containers, and more particularly, to an apparatus adapted to support a pair of cargo containers in double stacked relation on a third cargo container.

2. Reference to Prior Art

Cargo containers are widely used for hauling freight and are produced in various standard sizes which include, among others, containers of 20, 40, 45, 48 and 53 feet lengths and 96 inch and 102 inch widths. These containers are typically provided with cast housings which include locking openings used in securing the containers to various vehicles or surfaces. The cast housings are positioned in standard arrangements in both the top and bottom of the container. For example, a standard arrangement for 40 feet length cargo containers includes cast housings at each of the eight corners of the container. Containers in excess of 40 feet typically include intermediate frame structures for locating cast housings longitudinally inwardly of the corners so that housing arrangements for containers of 40 feet and longer match.

It is conventional practice to transport cargo containers by rail, with a first cargo container being placed in a railroad well car. A second cargo container of the same size as the first cargo container, or with a housing arrangement which otherwise matches the housing arrangement of the first cargo container, can be vertically double stacked on top of the first cargo container. Securement devices engageable with the locking openings in each of the corresponding housings in the top of the first container and the bottom of the second container secure the second container on the first container.

SUMMARY OF THE INVENTION

The present invention provides a container stacking apparatus for use in supporting at least one cargo container, and preferably two cargo containers, in double stacked relation on at least one other cargo container.

An object of the present invention is the provision of a container stacking apparatus which facilitates the efficient transport of relatively shorter cargo containers by rail.

Another object of the present invention is the provision of a container stacking apparatus for use in the stacking of at least three cargo containers on a railway car, the stacking apparatus including means for releaseably locking a frame down on one container, and means for releaseably locking a pair of containers down on the frame and in double stacked relation to the one container.

Another object of the present invention is the provision of a container stacking apparatus for securing on top of at least one first container having a first arrangement of housings, at least one second container having a second arrangement of housings which does not match the first arrangement of housings.

The container stacking apparatus includes a frame adapted to be supported on a first or lower container. The frame includes means for releaseably locking the frame down on the lower container, the means for releaseably locking including at least one first locking member having utility for restraining horizontal and upward movement of the frame relative to the lower container. The first locking member is positioned on the frame in alignment with a first opening or socket in a housing on the upper surface of the lower container. The first locking member is received in the first opening or socket when the frame is placed on the lower container to secure the frame to the lower container.

The frame also includes means for releaseably locking at least one second or upper cargo container down on the frame and in double stacked relation to the first cargo container. The means for releaseably locking the at least one upper cargo container down on the frame includes at least one second locking member having utility for restraining horizontal and upward movement of the upper cargo container relative to the frame. The second locking member is positioned on the frame in alignment with a second opening or socket in a housing on the lower surface of the upper container. The second locking member is received in the second opening or socket when the upper container is placed on the frame to secure the upper container to the frame.

Other features and advantages of the invention will become apparent to those skilled in the art upon review of the following detailed description, claims, and drawings.

BRIEF DESCRIPTION OF THE DRAWINGS

FIG. 1 is a schematic view, partially in section, of a cargo container stacking arrangement supported on a railroad car.

FIG. 2 is a front view of the cargo container stacking arrangement and railroad car shown in FIG. 1.

FIG. 3 is a reduced plan view of the cargo container stacking apparatus shown in FIG. 1.

FIG. 4 is a reduced top plan view of the lower cargo container shown in FIG. 1.

FIG. 5 is a reduced bottom plan view of one of the upper cargo containers shown in FIG. 1.

FIG. 6 is an enlarged view of one of the housings shown in FIGS. 4 and 5.

FIG. 7 is a view taken along line 7—7 in FIG. 6.

FIG. 8 is an enlarged top view of one of the locking members shown in FIG. 3.

FIG. 9 is a side view, partially in section, of the locking member shown in FIG. 8 in engagement with the housing of FIG. 7

FIG. 10 is an enlarged view taken along line 10—10 in FIG. 1.

FIG. 11 is a view taken along line 11—11 in FIG. 10.

FIG. 12 is a view taken along line 12—12 in FIG. 3.

FIG. 13 is a view taken along line 13—13 in FIG. 12.

FIG. 14 is a view taken along line 14—14 in FIG. 12.

FIG. 15 is an enlarged view partially in section, of one end of the container stacking apparatus shown in FIG. 3.

FIG. 16 is a view taken along line 16—16 in FIG. 15.

FIG. 17 is a view taken along line 17—17 in FIG. 15.

FIG. 18 is a view taken along line 18—18 in FIG. 15.

Figure 19:
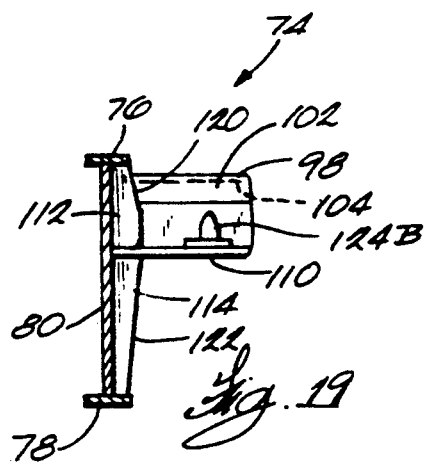
FIG. 19 is a view taken along line 19—19 in FIG. 10.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways.

Also, it is to be understood that the phraseology and terminology used herein is for the purpose of description and should not be regarded as limiting.

GENERAL DESCRIPTION

FIG. 1 illustrates a cargo container stacking arrangement 10 which is supported on a railroad car 12 and which embodies the invention. The railroad car 12 is preferably of a type known as a well car and includes a cargo container receiving well 14 which is defined by a support surface or floor 16, a front bulkhead wall 18, a rear bulkhead wall 20, and a pair of opposite sidewalls 22 and 24. Railroad wheels 26 support the well car 12 for movement along a track 28.

While in the illustrated arrangement, the cargo container stacking arrangement 10 is supported on a railroad well car 12 for transport, it is to be understood that the cargo container stacking arrangement 10 could be supported on other means of transportation of even on the ground.

As shown in FIG. 1, the cargo container stacking arrangement 10 comprising a lower tier including a first or lower cargo container 30, an upper tier including a pair of second or upper cargo containers 32 and 34 positioned end to end and in cantilevered relation on the first cargo container 30, and a container stacking apparatus 36 for securing the upper containers 32 and 34 in vertical or double stacked relation on the lower container 30. The lower container 30 fits into the well car well 14 and is supported on pads (not shown) which are located on the well car floor 16. When the container stacking apparatus 36 is lowered onto the lower container 30, the container stacking apparatus 36 is automatically secured in place on the lower container 30. Similarly, the upper containers 32 and 34 are automatically secured in place on the container stacking apparatus 36 when lowered thereon in stacked relation to the lower container 30, as will be further explained below.

The container stacking apparatus 36 can be adapted to secure various sizes of containers in double stacked relation and it si to be understood that the containers 30, 32 and 34 can be of a standard or nonstandard size. The lower container 30 is preferably of a standard 40, 45 or 48 feet length and in the illustrated arrangement is shown as being 48 feet long. Each of the upper containers 32 and 34 is preferably 24 or 28 feet long, and in the illustrated arrangement the upper containers 32 and 34 are each nonstandard 28 feet length containers.

As shown in the drawings, each of the cargo containers 30, 32 and 34 is generally box-like in appearance and includes a top, a bottom, opposite sides and opposite front and rear ends. Referring to FIG. 2, each of the lower cargo container 30 and the upper cargo containers 32 and 34 is provided with means, such as a set of doors 38, through which cargo can be loaded and unloaded. The doors 38 are preferably located at the rear end of each of the cargo containers 30, 32 and 34 and include hinges 40 and locking bar assemblies 42 for opening and closing the doors 38. Each of the containers 30, 32 and 34 can also include conventional means for facilitating over-the-road use so that the containers 30, 32 and 34 can be hauled individually or in tandem in a standard tractor trailer arrangement. An example of such means includes a channel 44 for receiving a chassis (not shown) which is attachable to a tractor.

Each of the containers 30, 32 and 34 includes a plurality of standard castings or housings 48 which are used in securing the containers in double stacked relation. While the housings 48 in the lower container 30 can be located in various positions, in the illustrated arrangement, the housings 48 are positioned in a first arrangement with a housing 48 located longitudinally inwardly from each of the four corners in the upper surface 50 of the lower container 30. The first arrangement corresponds to the arrangement of housings 48 in standard 40, 45 or 48 feet length containers. FIG. 4 shows the arrangement of housings 48 in the upper surface 50 of the lower container 30. Similarly, while the housings 48 in each of the upper containers 32 and 34 can be located in various positions, in the illustrated arrangement, the housings 48 in each of the upper containers 32 and 34 are positioned in a second arrangement in the respective lower surfaces 52 and 54. The second arrangement includes housings 48 at each of the two corners at one end, and also at locations spaced longitudinally inwardly from each of the two corners at the other end of each of the lower surfaces 52 and 54. FIG. 3 shows the positioning of housings 48 in the lower surface 52 of the upper container 32. Although not shown, the lower surface of the lower container 30 and the upper surfaces of the upper containers 32 and 34 are also typically provided with housings 48.

As shown in FIG. 6, each of the housings 48 includes an outer horizontal surface 56 which faces upwardly if the housing 48 is in the upper surface 50 of the lower container 30, and downwardly if the housing 48 is located in one of the lower surfaces 52 and 54 of the upper containers 32 and 34. A noncircular locking hole or opening 60 in the outer surface 56 communicates with a housing socket 62 (See FIG. 7) which is defined by an inner socket surface 64 and which extends either upwardly or downwardly from the locking opening 60. The locking opening 60 is defined by an outer perimeter or edge 66 in the outer surface 56 and an inner perimeter or edge 68 in the inner socket surface 64. Each of the housings 48 is preferably of a type specified in the standards of the Association of American Railroads, in which case additional openings (not shown) are included.

The container stacking apparatus 36 is provided to support the upper cargo containers 32 and 34 in doubled stacked relation on the lower container 30. While in the illustrated arrangement the container stacking apparatus 36 supports a pair of upper containers 32 and 34 in double stacked relation on a single lower container 30, in other arrangements, the container stacking apparatus 36 can support one or more upper containers in double stacked relation on one or more lower containers.

As shown in FIG. 3, the container stacking apparatus 36 includes an elongated frame 70 which fits on the lower container 30. Components of the frame 70 are secured together by suitable means such as welding. The frame 70 includes a pair of substantially parallel and preferably identical main beam assemblies 72 and 74. The main beam assemblies 72 and 74 are spaced apart from each other so that each of the containers 30, 32 and 34 fits therebetween. Each of the main beam assemblies 72 and 74 includes a top flange 76, a bottom flange 78, and a web 80 interconnecting the top flange 76 and the bottom flange 78 to form an I shape (FIG. 14).

As shown in FIG. 15, the opposite ends of each of the main beam assemblies 72 and 74 preferably includes a box beam assembly 82 having a pair complimentary box beam members 84 and 86 extending between the top flange 76 and the bottom flange 78, and also from the end of the web 80 to the ends of the flanges 76 and 78.

Each of the box beam assemblies 82 provides additional rigidity and strength to the ends of the main beam assemblies 72 and 74. Stiffeners 88 are provided at various locations in each box beam assembly 82.

The frame 70 includes a pair of elongated tubular end crossmembers 92 and 94 interconnecting the ends of the main beam assemblies 72 and 74 to form a generally rectangular structure. As shown in FIG. 16 with respect to end crossmember 92, each of the end crossmembers 92 and 94 includes a downwardly slanted surface 96 which can serve as a guide to assist in positioning the frame 70 on top of the lower container 30.

As shown in FIG. 10, the frame 70 also includes an elongated midspan crossmember 98 interconnecting the midsections of the main beam assemblies 72 and 74. The midspan crossmember 98 includes opposite outwardly and upwardly facing slanted surfaces 100 and 102 which can serve as guides to assist in positioning the upper containers 32 and 34 on the frame 70 so that the midspan crossmember 98 separates the upper containers 32 and 34 from each other. An I-beam member 104 extending beneath the midspan crossmember 98 and between the main beam assemblies 72 and 74 supports the midspan crossmember 98.

The frame 70 is provided with means for supporting the frame 70 on the lower container 30. In the illustrated arrangement, the means for supporting the frame 70 on the lower container 30 includes four substantially horizontal, coplanar first plates 106. Each of the first plates 106 is secured along one side to one of the main beam assemblies 72 and 74 and is positioned to extend over one of the housings 48 in the upper surface 50 when the frame 70 is placed on the lower container 30. As shown in FIG. 17, each of the first plates 106 is supported by a pair of upwardly extending gusset members 107 and a downwardly extending gusset member 109 each secured to one of the main beam assemblies 72 and 74.

The frame 70 also includes means for supporting the upper containers 32 and 34 thereon. While various means for supporting the upper containers 32 and 34 can be employed, in the illustrated arrangement, the supporting means includes a plurality of substantially horizontal, coplanar second plates including a pair of preferably hexagonally shaped midspan plates 110. Each of the midspan plates 110 is secured along one side to one of the main beam assemblies 72 and 74 and engages the underside of the midspan crossmember 98. The midspan plates 110 respectively extend beneath one of the housings 48 in each of the lower surfaces 52 and 54 when the upper containers 32 and 34 are placed on the frame 70. Each of the midspan plates 110 is provided with a pair of upwardly extending midspan gusset members 112, and three downwardly extending midspan gusset members 114. The midspan gusset members 112 and 114 are each secured to one of the main beam assemblies 72 and 74 and provide added support to the midspan plates 110.

The means for supporting the upper containers 32 and 34 on the frame 70 also includes end or corner plates 116. The corner plates 116 are positioned at each of the four intersections of the end crossmembers 92 and 94 and the main beam assemblies 72 and 74. Each of the corner plates 116 is secured along one side to one of the main beam assemblies 72 and 74 with the lower surface of each of the corner plates 116 engaging the top side of one of the end crossmembers 92 and 94. Each of the corner plates 116 extends beneath one of the housings 48 in one of the lower surfaces 52 and 54 when the upper container 32 and 34 are placed on the frame 70.

An upwardly extending end gusset member 118 extends upwardly from each corner plate 116 for added support.

Figure 20:
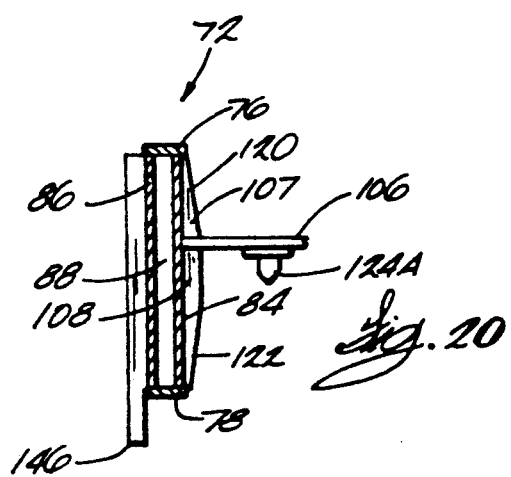
FIG. 20 is a view taken along line 20—20 in FIG. 17.

As shown in FIGS. 18, 19 and 20, each of the upwardly extending gusset members 107, 112 and 118 includes an upwardly facing slanted surface 120 which can act as a guide in positioning one of the upper containers 32 and 34 in its proper position on the frame 70. Additionally, each of the downwardly extending gusset members 108 and 114 includes a downwardly facing slanted surface 122 which can act as a guide in positioning the frame 70 in its proper position on the lower container 30.

The frame 70 includes a plurality of locking members 124. The locking members 124 include a set of first locking members 124A for releaseably securing the frame 70 down on the lower container 30. Each of the first locking members 124A is secured to one of the first plates 106 and extends downwardly therefrom. Each of the first locking members 124A is aligned with and corresponds to one of the housings 48 in the lower container 30.

The locking members 124 also include a set of second locking members 124B for releaseably locking the upper containers 32 and 34 down on the frame 70. Each of the second locking members 124B is secured to one of the midspan plates 110 or the corner plates 116 and extends upwardly therefrom. Each of the second locking members 124B is aligned with and corresponds to one of the housings 48 in the upper containers 32 and 34.

It is to be understood that the positions of the first plates 106, the midspan plates 110, and the corner plates 116 can be varied to change the positions of the first and second locking members 124A and 124B to accommodate upper and lower containers having any of various housing arrangements.

While various configurations of locking members 124 can be employed, in the illustrated arrangement the locking members 124 are preferably of the type disclosed in U.S. Pat. No. 4,626,155, issued Dec. 12, 1986, to Hlinsky et al, and the disclosure of which is herein incorporated by reference.

FIG. 9 illustrates engagement of a locking member 124 with a housing 48 to releaseably lock the locking member 124 within the housings 48. As shown in FIG. 9, the locking member 124 includes a base 126 adapted to be secured to one of the first plates 106, the midspan plates 110, or the corner plates 116. A head 128 is pivotally mounted on a shear block 130 which projects from the base 126. The head 128 is pivotable between a locked position (shown in solid lines in FIG. 8) and a loading position (shown in broken lines in FIG. 8). A torsional spring (not shown) is provided to bias the head 128 to the locked position.

To facilitate entry of the head 128 into the housing 48 the head 128 is provided with a first cam surface 132 which is configured to interact with the outer edge 66 of the locking opening 60. Engagement of the first cam surface 132 with the outer edge 66 pivots the head 128 to the loading position when an entry force is applied. This permits movement of the head 128 through the locking opening 60 and into the socket 62. When the head 128 extends fully into the socket 62, the head 128 is returned to the locking position by the torsional spring to secure the locking member 124 within the housing 48. The shear block 130 is received in the locking opening 60 to prevent horizontal movement in any direction of the locking member 124 and housing 48 relative to one another.

To facilitate removal of the locking member 124 from the housing 48, the head 128 is provided with a second cam surface 134. The second cam surface 134 is configured to interact with the inner edge 68 of the locking opening 60 to rotate the head from the locked position to the loading position when an exit force is applied. The exit force is preferably substantially greater than the entry force so that automatic unlocking and release of the locking member 124 from the housing 48 is substantially more difficult than automatic locking of the locking member 124 within the housing 48, as explained in the aforementioned U.S. Pat. No. 4,626,155.

To load the upper containers 32 and 34 in double stacked relation on the lower container 30, the frame 70 is lowered on to the lower container 30 so that the first locking members 124A engage the locking openings 60 of the corresponding housings 48 in the upper surface 50. The weight of the frame 70 provides a first force preferably greater than the combined entry forces required to automatically lock the first locking members 124A within their corresponding housings 48 in the lower container 30. The heads 128 and shear blocks 130 of the first locking members 124A respectively lock the frame 70 down on the lower container 30 and restrain horizontal movement of the frame 70 relative to the lower container 30. Before or after the frame 70 is lowered on to the lower container 30, each of the upper containers 32 and 34 is individually lowered on to the frame 70 so that the second locking members 124B engage the locking openings 60 of the corresponding housings 48 in the upper containers 32 and 34. The empty weight of each of the upper containers 32 and 34 is preferably sufficient to provide the combined entry forces required to automatically lock the second locking members 124B within their corresponding housings 48 in the upper containers 32 and 34. The heads 128 and shear blocks 130 of the second locking members 124B respectively lock the upper containers 32 and 34 down on the frame 70 and restrain horizontal movement of the upper containers 32 and 34 relative to the frame 70.

To unload containers 30, 32 and 34, a conventional straddle lift or other device can be used to individually lift the upper containers 32 and 34 from the frame 70. The exit forces required to automatically release the upper containers 32 and 34 from the frame 70 are provided by the straddle lift. The straddle lift can be used in a similar fashion to remove the frame 70 from the upper container.

The frame 70 is provided with four top lift or straddle lift assemblies 136. A straddle lift assembly 136 is positioned at each of two locations on each of the main beam assemblies 72 and 74. As shown in FIG. 13, each of the straddle lift assemblies 136 includes four spaced apart channel reinforcements 138 secured to the inside of one of the main beam assemblies 72 and 74. Each of the straddle lift assemblies 136 also includes a lifting bar or plate 140 extending outwardly from the bottom of flange 78. The lifting plate 140 and bottom surface of flange 78 together form a generally horizontal lifting surface. Each of the straddle lift assemblies 136 also includes a cap member 142 angling between the lifting plate 140 and the web 80, and a plurality of triangular members 143. The cap member 140 and the triangular members 143 cooperate to transmit lifting forces on the straddle lift assembly 136 to one of the main beam assemblies 72 and 74. D-rings 144 are also provided to facilitate lifting the frame 70 by means such as chains or the like.

The frame 70 is provided with leg channels 146 which have enlarged tops and narrowed bottoms to facilitate the stacking of a number of frames 70 on top of one another. In stacking the frames 70 for storage or transport, the narrowed bottoms of the leg channels 146 of a first or upper frame are inserted into the enlarged tops of the leg channels 146 of a second or lower frame to stack the frames.

One of the advantages of the container stacking apparatus 36 is that it enables a pair of relatively shorter upper containers 32 and 34 to be transported by rail on a relatively longer lower container 30 to more efficiently transport the shorter containers. The double stacking of a pair of relatively shorter upper containers 32 and 34 on a lower container 30 allows the railroads to be more competitive in the less than truckload market.

p Various features of the invention are set forth in the following claims.

We claim:

1. A container stacking assembly comprising:

a first cargo container, an upper tier including a pair of second cargo containers, each of the second containers including a top, a bottom, opposite sides and opposite ends, an elongated frame supported solely on the first cargo container, the elongated frame including means for supporting the pair of second cargo containers lengthwise in end-to-end and stacked relation thereon, the upper tier being supported solely by the elongated frame, and the upper tier being supported in cantilevered relation to the first cargo container, means for releaseably locking the frame down on the first cargo container, and means for releaseably locking the pair of cargo containers down on the frame.

2. A container stacking apparatus as set forth in claim 1, wherein the first cargo container is relatively longer than each of the pair of cargo containers.

3. A container stacking assembly as set forth in claim 1, wherein the second cargo containers are each supported in cantilevered relation to the frame.

4. A container stacking assembly as set forth in claim 3, wherein the first cargo container has a length, wherein the frame includes opposite end portions and has a length substantially longer than the length of the first cargo container so that each of the opposite end portions of the frame is cantilevered relative to the first cargo container, and wherein each of the second cargo containers has a length, the combined lengths of the second cargo containers being substantially longer than the length of the frame.

5. A container stacking assembly as set forth in claim 4, wherein the container stacking assembly further comprises a railway car including a well having a length substantially equal to the length of the first cargo container, the first cargo container being recieved in the well.

6. A container stacking apparatus for use in supporting an upper tier including two cargo containers in stacked relation on a lower tier including a first cargo container, the first cargo container having a length which is greater than the length of each of the two cargo containers, the containers stacking apparatus comprising:

a frame including means for supporting the frame on the lower tier, the frame being adapted to be supported solely by the first cargo container, and means for supporting the upper tier on the frame and in stacked cantilevered relation to the lower tier, the means for supporting the upper tier being adapted to support the pair of cargo containers lengthwise in end-to-end relation, and the frame being adapted to solely support the second tier, means for releaseably locking the frame down against the lower tier, and means for releaseably locking the upper tier down on the frame.

7. A container stacking apparatus as set forth in claim 6, wherein the means for supporting the upper tier on the frame is adapted to support each of the second cargo containers in cantilevered relation to the first cargo container.

8. A container stacking apparatus for use in supporting in stacked relation on a lower tier including a first cargo container an upper tier including a second cargo container, the lower tier including a plurality of first housings positioned with respect to one another in a first arrangement, and the upper tier including a plurality of second housings positioned with respect to one another in a second arrangement different from the first arrangement, said apparatus comprising:

a frame including means for supporting the frame directly on the lower tier and means for supporting the upper tier thereon, a plurality of first locking members positioned on the frame to identically match the arrangement of first housings in the lower tier, each of the first locking members being adapted to releaseably engage one of the first housings when the frame is placed on the lower tier, and a plurality of second locking members positioned on the frame to identically match the arrangement of second housings in the upper tier, each of the second locking members being adapted to releaseably engage one of the second housings when the upper tier is placed on the frame.

9. A container stacking apparatus as set forth in claim 8, wherein the means for supporting the upper tier is adapted to support the upper tier in cantilevered relation to the lower tier.

10. A container stacking apparatus as set forth in claim 9, wherein the means for supporting the frame on the lower tier is adapted to solely support the frame on the first cargo container, and wherein the means for supporting the upper tier on the frame is adapted to solely support the upper tier.

11. A container stacking assembly comprising:

a lower tier including only a first cargo container, an upper tier including only a pair of second cargo containers, the first cargo container being relatively longer than each of the second cargo containers, a frame supported solely on the first cargo container and including means for supporting the upper tier thereon and in stacked cantilevered relation to the lower tier, the pair of second cargo containers being solely supported by the frame, means for releaseably locking the frame down on the lower tier, and means for releaseably locking the upper tier down on the frame.

12. A container stacking assembly as set forth in claim 11, wherein each of the second containers is supported in cantilevered relation to the first cargo container.

13. A container stacking assembly as set forth in claim 12, wherein each of the second cargo containers includes a top, a bottom, opposite sides, and opposite ends, and wherein the means for supporting supports said pair of cargo containers in end to end relation on the frame.

14. A container stacking assembly as set forth in claim 13, wherein the means for supporting the upper tier supports each of the second cargo containers in cantilevered relation to the first cargo container.

15. A container stacking assembly comprising:

a lower tier including only a first cargo container, the lower tier including a plurality of first housings positioned with respect to one another in a first arrangement, an upper tier including only a pair of second cargo containers, each of the second cargo containers having a length, and the first cargo container being relatively longer than each of the second cargo containers, and the upper tier including a plurality of second housings positioned with respect to one another in a second arrangement different from the first arrangement, a frame supported solely on the first cargo container, the frame including means for supporting the upper tier thereon and in stacked relation relative to the lower tier, the pair of cargo containers being supported in lengthwise end-to-end relation, the pair of second cargo containers being supported solely by the frame, and at least one of the second cargo containers being supported in cantilevered relation to the first cargo container, a plurality of first locking members positioned on the frame to match the arrangement of first housings in the lower tier, each of the first locking members releaseably engaging one of the first housings in the lower tier when the frame is placed on the lower tier, and a plurality of second locking members positioned on the frame to match the arrangement of housings in the upper tier, each of the second locking members releaseably engaging one of the second housings in the upper tier when the upper tier is placed on the frame.

16. A container stacking assembly as set forth in claim 15, wherein the first cargo container has a length, and wherein the combined lengths of the second cargo containers is substantially longer than the length of the first cargo container so that each of the second cargo containers is supported in cantilevered relation to the first cargo container.

17. A container stacking assembly as set forth in claim 16, wherein the frame includes opposite end portions and has a length substantially longer than the length of the first cargo container so that each of the opposite end portions of the frame is cantilevered relative to the first cargo container, and wherein the combined length of the second cargo containers is substantially longer than the length of the frame so that each of the second cargo containers is supported in cantilevered relation on the frame.

* * * * *